(12) United States Patent
Sartori et al.

(10) Patent No.: US 9,411,760 B2
(45) Date of Patent: Aug. 9, 2016

(54) SYSTEM AND METHOD FOR A THIN-CLIENT TERMINAL SYSTEM WITH A LOCAL SCREEN BUFFER USING A SERIAL BUS

(75) Inventors: Gabriele Sartori, Fremont, CA (US); Subir Ghosh, San Jose, CA (US); William Liao, Sunnyvale, CA (US)

(73) Assignee: nComputing Inc., Santa Clara, CA (US)

( * ) Notice: Subject to any disclaimer, the term of this patent is extended or adjusted under 35 U.S.C. 154(b) by 680 days.

(21) Appl. No.: 13/499,516

(22) PCT Filed: Oct. 1, 2010

(86) PCT No.: PCT/US2010/051211
§ 371 (c)(1),
(2), (4) Date: May 15, 2012

(87) PCT Pub. No.: WO2011/041740
PCT Pub. Date: Apr. 7, 2011

(65) Prior Publication Data
US 2012/0219070 A1 Aug. 30, 2012

Related U.S. Application Data

(60) Provisional application No. 61/248,399, filed on Oct. 2, 2009.

(51) Int. Cl.
*G06F 15/16* (2006.01)
*G06F 13/38* (2006.01)

(52) U.S. Cl.
CPC ...... *G06F 13/385* (2013.01); *G06F 2213/3812* (2013.01)

(58) Field of Classification Search
CPC ................................ H04L 67/04; H04L 67/10
USPC ......................................................... 709/203
See application file for complete search history.

(56) References Cited

U.S. PATENT DOCUMENTS

| 7,317,734 | B2 * | 1/2008 | Joy et al. ...................... 370/466 |
|---|---|---|---|
| 8,165,155 | B2 * | 4/2012 | MacInnis et al. .............. 370/465 |
| 2001/0056464 | A1 * | 12/2001 | Ishihara et al. ............... 709/203 |
| 2004/0042476 | A1 | 3/2004 | Peacock |
| 2007/0097130 | A1 * | 5/2007 | Margulis ............... G06F 3/1431 345/501 |
| 2008/0010340 | A1 * | 1/2008 | Orady et al. ................... 709/203 |
| 2009/0002569 | A1 * | 1/2009 | Matsukura et al. ........... 348/721 |
| 2010/0036992 | A1 * | 2/2010 | Sisto et al. .................... 710/305 |

OTHER PUBLICATIONS

"International Application Serial No. PCT/US2010/051211, Preliminary Report on Patentability mailed Mar. 8, 2012", 9 pgs.
"International Application Serial No. PCT/US2010/051211, Search Report mailed Nov. 23, 2010", 4 pgs.
"International Application Serial No. PCT/US2010/051211, Written Opinion mailed Nov. 23, 2010", 17 pgs.

* cited by examiner

*Primary Examiner* — Arvin Eskandarnia
(74) *Attorney, Agent, or Firm* — Schwegman Lundberg & Woessner, P.A.

(57) ABSTRACT

In a system and method for a thin-client terminal system having a local screen buffer using a serial bus, a serial bus interface device receives encoded data from a thin-client server system. The serial bus interface device decodes the encoded data according to a serial bus data format and provides the decoded data to a thin-client control system. The thin-client control system distributes the decoded data for processing to a video processing system, an audio processing system, and an input/output control system. The thin-client control system also receives input data from input devices connected to the thin-client terminal system. The input data is processed and encoded according to the serial bus data format for transmission to the thin-client server system.

24 Claims, 9 Drawing Sheets

SYSTEM AND METHOD FOR A THIN-CLIENT TERMINAL SYSTEM WITH A LOCAL SCREEN BUFFER USING A SERIAL BUS

CROSS-REFERENCE TO RELATED APPLICATIONS

This application is a U.S. National Stage Filing under 35 U.S.C. 371 from International Patent Application Serial No. PCT/US2010/051211, filed Oct. 1, 2010, and published on Apr. 7, 2011 as WO 2011/041740 A1, which claims the benefit of U.S. Provisional Patent Application Ser. No. 61/248, 399, filed Oct. 2, 2009 ("SYSTEM AND METHOD FOR A THIN-CLIENT TERMINAL SYSTEM WITH A LOCAL SCREEN BUFFER USING A SERIAL BUS"), the contents of which are incorporated herein by reference in their entirety.

TECHNICAL FIELD

The present invention relates to the fields of terminal systems. In particular, but not by way of limitation, the present invention discloses techniques for implementing a thin-client graphics terminal system.

BACKGROUND

Centralized computer systems with multiple independent terminal systems for accessing the centralized computer systems were once the dominant computer system architecture. These centralized computer systems were initially very expensive mainframe or mini-computer systems that were shared by multiple computer users. Each of the computer system users accessed the centralized computer systems using a computer terminal system coupled to the centralized computer systems.

In the late 1970s and early 1980s, semiconductor microprocessors and memory devices allowed for the creation of inexpensive personal computer systems. Personal computer systems revolutionized the computing industry by allowing each individual computer user to have access to a full computer system without having to share the computer system with any other computer user. Each personal computer user could execute their own software applications and any problems with the computer system would only affect that single personal computer system user.

Although personal computer systems have become the dominant form of computing in the modern world, there has been a resurgence of the centralized computer system model wherein multiple computer users access a single server system using modern terminal systems that include high-resolution graphics. Computer terminal systems can significantly reduced computer system maintenance costs since computer terminal users cannot easily introduce computer viruses into the main computer system or load other unauthorized computer programs. Terminal based computing also allows multiple users to easily share the same set of software applications.

Modern personal computer systems have become increasingly powerful in the decades since the late 1970's personal computer revolution. Modern personal computer systems are now more powerful than the shared mainframe and mini-computer systems of the 1970's. In fact, modern personal computer systems are so powerful that the vast majority of the computing resources in modern personal computer systems generally sit idle when a typical computer user uses a modern personal computer system. Thus, personal computer systems can now easily serve multiple computer users.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to a thin-client system, the teachings can be used in other environments. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
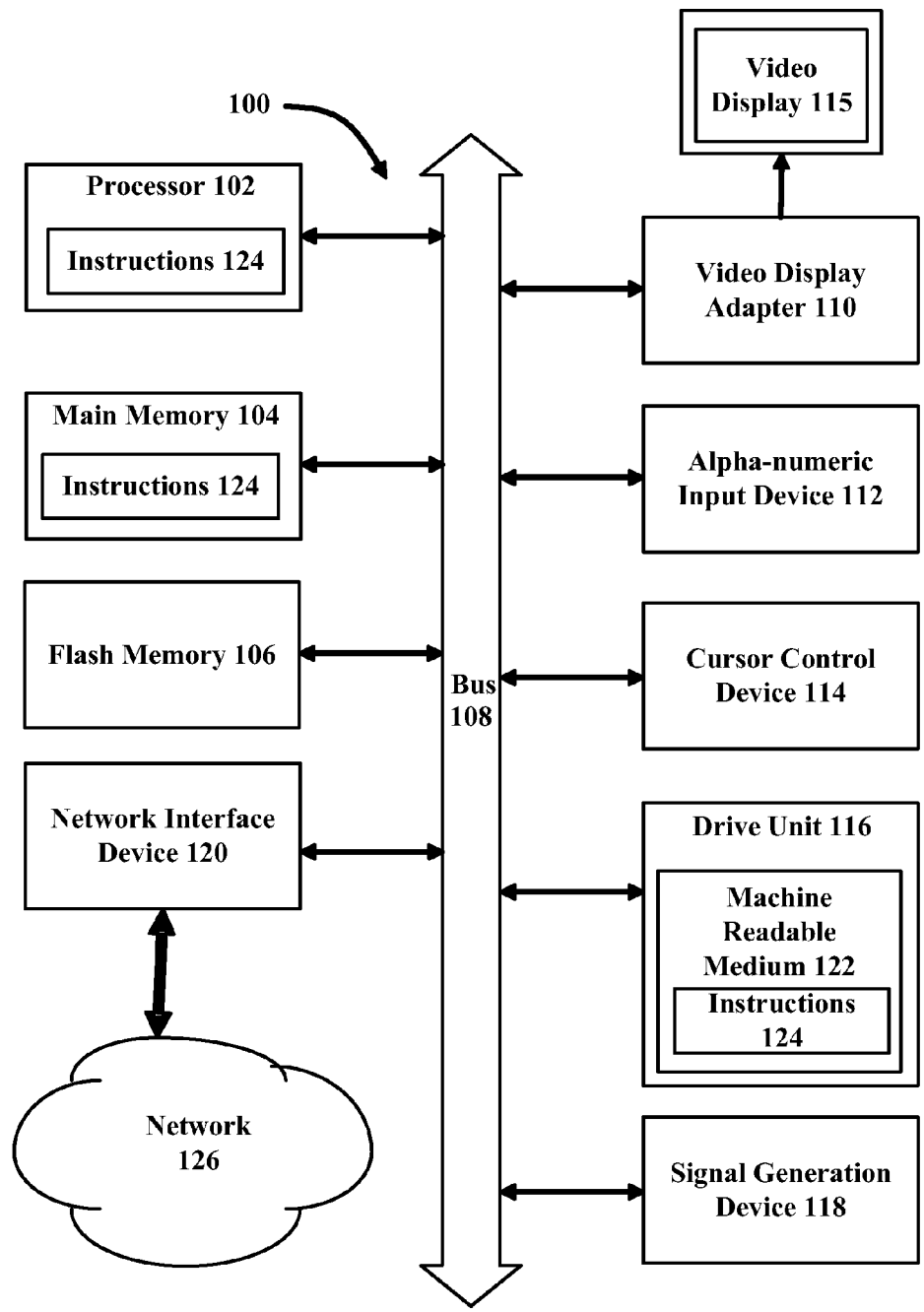
FIG. 1 illustrates a diagrammatic representation of machine in the example form of a computer system within which a set of instructions, for causing the machine to perform any one or more of the methodologies discussed herein, may be executed.

The present disclosure concerns digital computer systems. FIG. 1 illustrates a diagrammatic representation of machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server machine or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), a main memory 104 and a flash memory 106, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120.

The disk drive unit 116 includes a machine-readable medium 122 on which is stored one or more sets of computer instructions and data structures (e.g., instructions 124 also known as "software") embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media.

The instructions 124 may further be transmitted or received over a computer network 126 via the network interface device 120. Such transmissions may occur utilizing any one of a number of well-known transfer protocols such as the well known File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Modern Thin-Client Terminal Systems

In recent years, a new generation of terminal systems that support high-resolution graphics have been introduced into the computer market. These new terminal systems have allowed a new generation of users to rediscover many of the advantages of a terminal-based computing architecture. For example, computer terminals allow for improved computer system security and reduced maintenance costs since users of computer terminal systems cannot easily introduce computer viruses by downloading or installing new software into the computer system from the terminal system. Thus, with a centralized computer system having multiple terminals, only the main centralized computer server system needs to be closely monitored and maintained. The stateless terminal systems require almost no maintenance at all.

One category of these modern terminal systems is called "thin client" systems since the terminal systems are a "client" to main computer system that acts as a server and the terminal systems are designed to be very simple and limited (thus "thin"). This thin-client terminal systems primarily depend on a thin-client server system for all (or nearly all) of their application processing activities. A thin-client terminal system thus mainly focuses only on conveying output from the centralized server system to the user and input from the user to the centralized server system.

The new generation of computer terminal systems provide features that did not exist during the prior era of computer terminal usage. Specifically, modern terminal systems include modern amenities such as high-resolution graphics capabilities, audio output, and cursor control system input (mouse, trackpad, trackball, etc.). Thus, modern terminal systems can provide all the features that users of modern personal computer systems have become accustomed to using.

A Thin-Client System

Figure 2A:
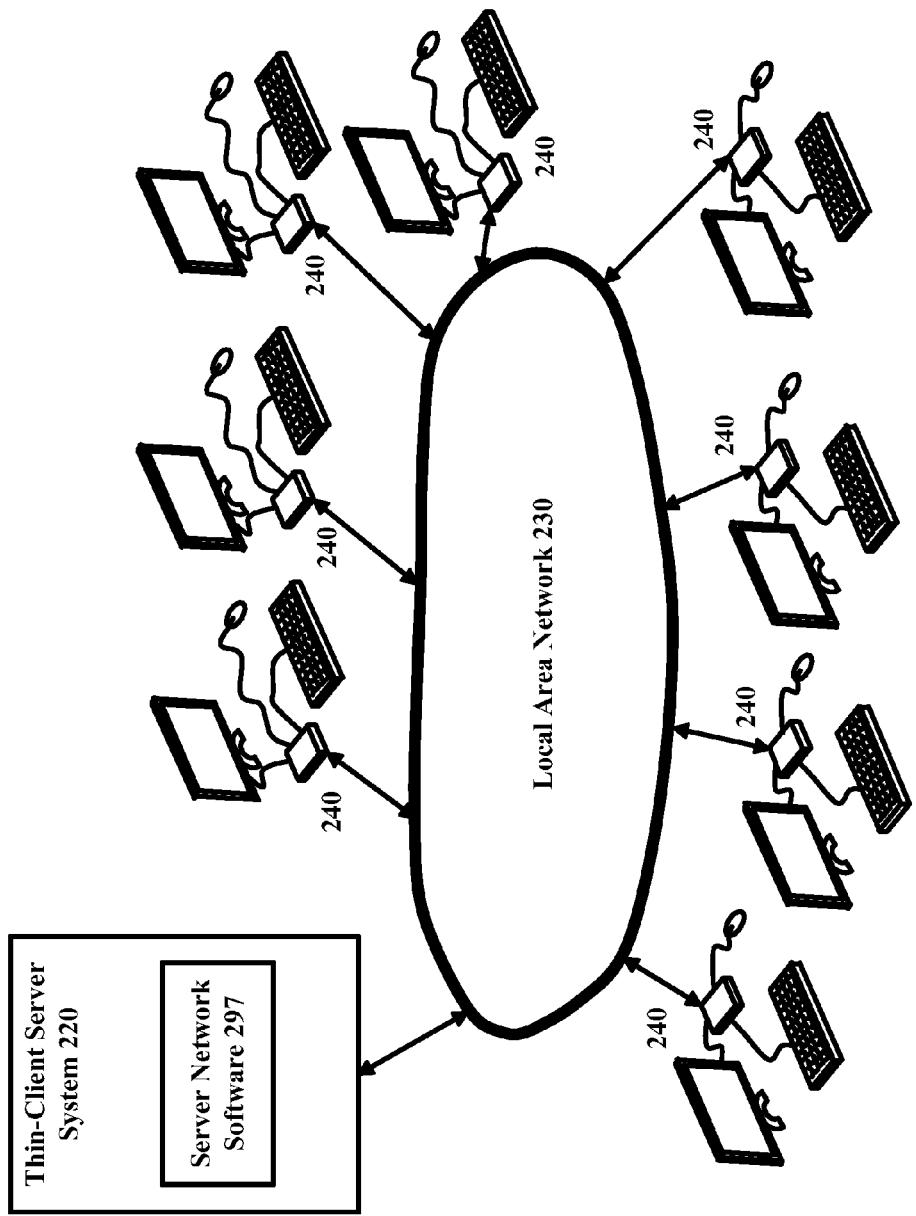
FIG. 2A illustrates a high-level block diagram of a single thin-client server computer system supporting multiple individual thin-client terminal systems using a local area network.

FIG. 2A illustrates a conceptual diagram of a thin-client environment. Referring to FIG. 2A, a single thin-client server computer system 220 provides computer processing resources to many thin-client terminal systems 240. In the embodiment of FIG. 2A, each of the individual thin-client terminal systems 240 is coupled to the thin-client server computer system 220 using local area network 230 as a bi-directional communication channel. The individual thin-client terminal systems 240 transmit user input (such as key strokes and mouse movements) across the local area network 230 to the thin-client server system 220 and the thin-client server system 220 transmits output information (such as video and audio) across the local area network 230 to the individual thin-client terminal systems 240.

Figure 2B:
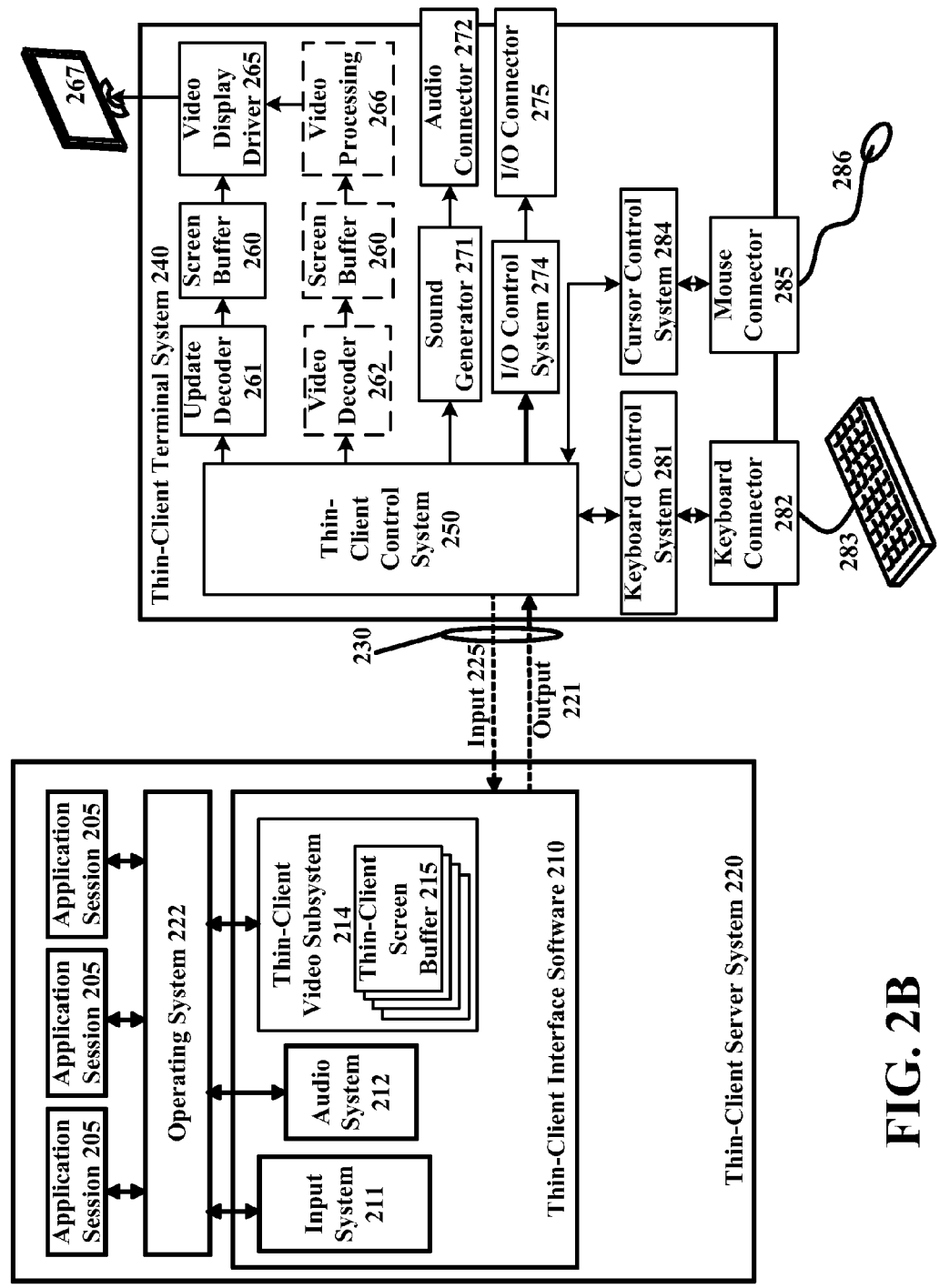
FIG. 2B illustrates a block diagram of a thin-client terminal system coupled to a thin-client server computer system.

FIG. 2B illustrates a block diagram of one embodiment of a thin-client server computer system 220 coupled to one (of possibly many) thin-client terminal system 240. The thin-client server computer system 220 and thin-client terminal system 240 are coupled to a with a bi-directional digital communications channel 230 that may be a serial data connection, an Ethernet connection, or any other suitable bi-directional digital communication means such as the local area network 230 of FIG. 2A.

The goal of thin-client terminal system 240 is to provide most or all of the standard input and output features of a personal computer system to the user of the thin-client terminal system 240. However, this goal should be achieved at the lowest possible cost since if a thin-client terminal system 240 is too expensive, a personal computer system could be purchased instead. Keeping the cost low can be achieved since the thin-client terminal system 240 will not need the full computing resources or software of a personal computer system since those features will be provided by the thin-client server system 220 that will interact with the thin-client terminal system 240.

Referring back to FIG. 2B, the thin-client terminal system 240 provides both visual and auditory output using a high-resolution video display system and an audio output system. The high-resolution video display system consists of a graphics update decoder 261, a screen buffer 260, and a video adapter 265. When changes are made to a representation of a terminal's display in thin-client screen buffer 215 within the server system 220, a graphics encoder 217 identifies those changes to the thin-client screen buffer 215, encodes the changes, and then transmits the changes to the thin-client terminal system 240. Within the thin-client terminal system 240, the graphics update decoder 261 decodes graphical changes made to the associated thin-client screen buffer 215 in the server and applies those same changes to the local screen buffer 260 thus making screen buffer 260 an identical copy of the bit-mapped display information in thin-client screen buffer 215. Video adapter 265 reads the video display information out of screen buffer 260 and generates a video display signal to drive display system 267.

In an alternate embodiment, a parallel full-motion video system is provided to handle full motion video. The parallel system comprises a video decoder 262 for decoding a full motion video stream, a video buffer 268 for storing video frames from the decoded video stream, and a video processor 266 for reformatting the full motion video for display within a window in the screen buffer 260. The video display driver 265 integrates the two video processing paths.

The audio sound system of thin-client terminal system 240 operates in a similar manner to the video system. The audio system consists of a sound generator 271 for creating a sound signal coupled to an audio connector 272. The sound generator 271 is supplied with audio information thin-client control system 250 using audio information sent as output 221 by the thin-client server system 220 across bi-directional communications channel 230.

From an input perspective, thin-client terminal system 240 allows a terminal system user to enter both alpha-numeric (keyboard) input and cursor control device (mouse) input that will be transmitted to the thin-client computer system 220. The alpha-numeric input is provided by a keyboard 283 coupled to a keyboard connector 282 that supplies signals to a keyboard control system 281. Thin-client control system 250 encodes keyboard input from the keyboard control system 281 and sends that keyboard input as input 225 to the thin-client server system 220. Similarly, the thin-client control system 250 encodes cursor control device input from cursor control system 284 and sends that cursor control input as input 225 to the thin-client server system 220. The cursor control input is received through a mouse connector 285 from a computer mouse 285 or any other suitable cursor control device such as a trackball, trackpad, etc. The keyboard connector 282 and mouse connector 285 may be implemented with a PS/2 type of interface, a USB interface, or any other suitable interface.

The thin-client terminal system 240 may include other input, output, or combined input/output systems in order to provide additional functionality to the user of the thin-client terminal system 240. For example, the thin-client terminal system 240 illustrated in FIG. 2B includes input/output control system 274 coupled to input/output connector 275. Input/output control system 274 may be a Universal Serial Bus (USB) controller and input/output connector 275 may be a USB connector in order to provide Universal Serial Bus (USB) capabilities to the user of thin-client terminal system 240.

Thin-client server computer system 220 is equipped with multi-tasking software for interacting with multiple thin-client terminal systems 240. As illustrated in FIG. 2B, thin-client interface software 210 in thin-client server system 220 supports the thin-client terminal system 240 as well as any other thin-client terminal systems coupled to thin-client server system 220. Thin-client interface software 210 may include an input system for generating input device (e.g., keyboard, mouse) commands and output data. The input device commands and output data may be generated in response to input data received from a thin-client terminal system 240. Thin-client interface software 210 further may include an audio system for generating audio output data for transmission to the thin-client terminal system 240. The thin-client server system 220 keeps track of the state of each thin-client terminal system 240 by maintaining a thin-client screen buffer 215 in the thin-client server system 220 for each thin-client terminal system 240. The thin-client screen buffer 215 in the thin-client server system 220 contains representation of what is displayed on the associated thin-client terminal system 240.

The thin-client terminal system illustrated in FIGS. 2A and 2B is works well in a networked environment. However, some customers may wish to take advantage of thin-client based computing without having to install a computer network. If such customers do not wish to install a computer network, they are probably even less likely to be interested in opening up a computer system to install an add-in peripheral card in order to provide thin-client terminal services to external terminals.

A First USB-based Thin-Client Terminal System

It is not currently possible to provide thin-client terminal services to a customer that does not wish to install a network nor open up a computer system to install an add-in peripheral card. To remedy this situation, the present disclosure introduces a serial bus-based thin-client terminal system. The terminal system will be disclosed with reference to the popular Universal Serial Bus (USB), but other serial protocols may also be used.

Figure 3A:
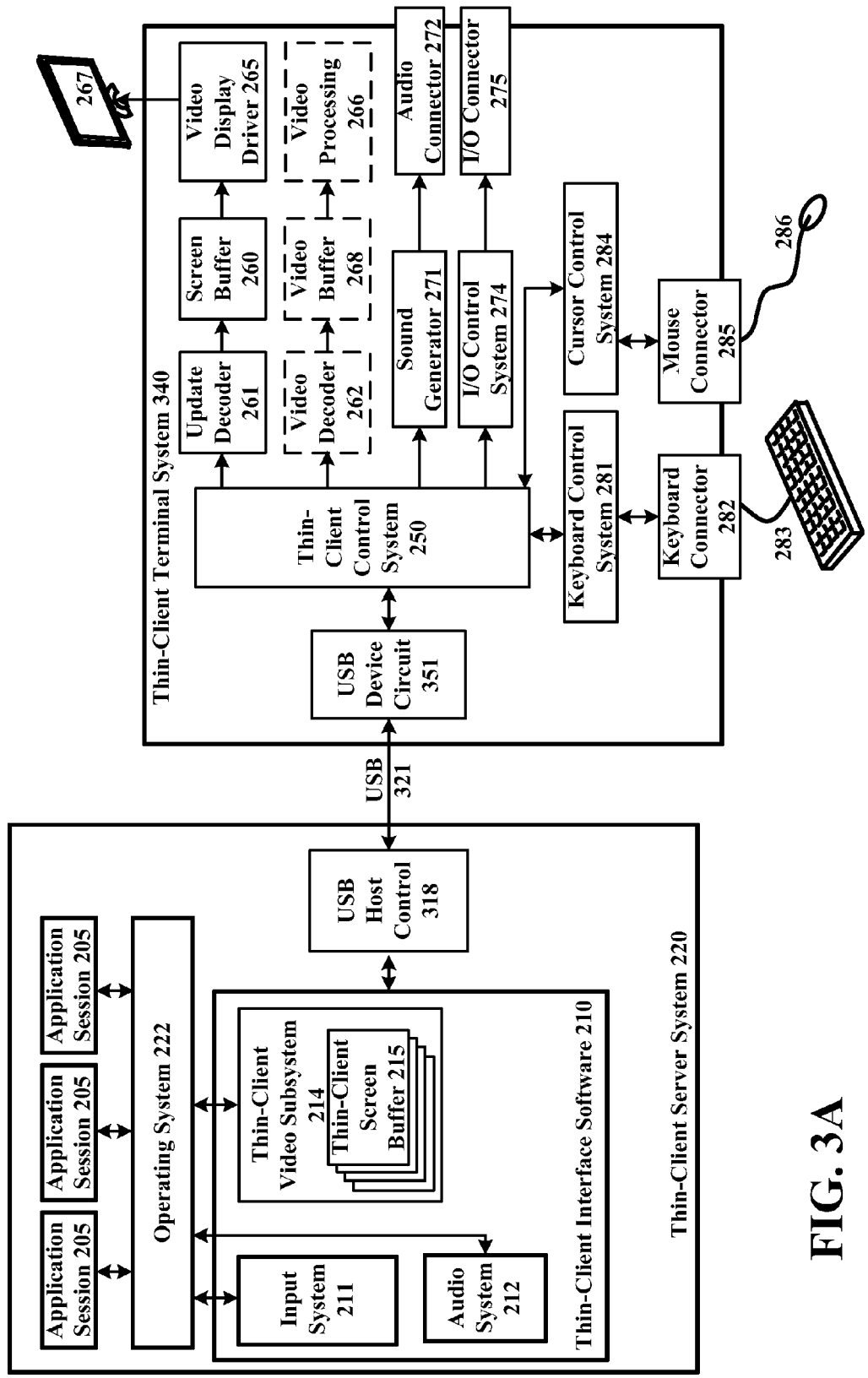
FIG. 3A illustrates a high-level block diagram of a first embodiment of a thin-client terminal server coupled to a thin-client terminal system using a universal serial bus (USB) 321.

FIG. 3A illustrates a high-level block diagram of a first embodiment of a thin-client terminal server 320 coupled to a thin-client terminal system 340 using a universal serial bus (USB) 321. Certain aspects of thin-client terminal system 340 may be similar to the thin-client terminal system example embodiment 240 of FIG. 2B. For example, thin-client terminal system 340 may include the high-resolution video display system and audio system of the example embodiment of FIG. 2B. In operation, the thin-client interface software 310 formats the data packets it needs to exchange with the thin-client terminal system 340 and then provides those packets to a USB host controller 318 on the thin-client terminal server 320. The USB host controller 318 then transmits those data packets out on a universal serial bus (USB) 321 coupled to the thin-client terminal server 320.

In the thin-client terminal system 340, a USB device circuit 351 receives the data packets transmitted on the universal serial bus (USB) 321. If the packets are addressed to the thin-client terminal system 340, then the USB device circuit 351 will decode those packets and provide those packets to the thin-client control system 250.

The same process happens in reverse to provide user input from the thin-client terminal system 340 back to the thin-client terminal server 320. User input from the keyboard control system 281 and the cursor control system 284 are first provided to the thin-client control system 250. The thin-client passes the user input information to the USB device circuit 351. The USB device circuit 351 then encodes and transmits the user information across the USB line 321 to the USB host controller 318 on the thin-client terminal server 320.

A Second USB-based Thin-Client Terminal System

Figure 3B:
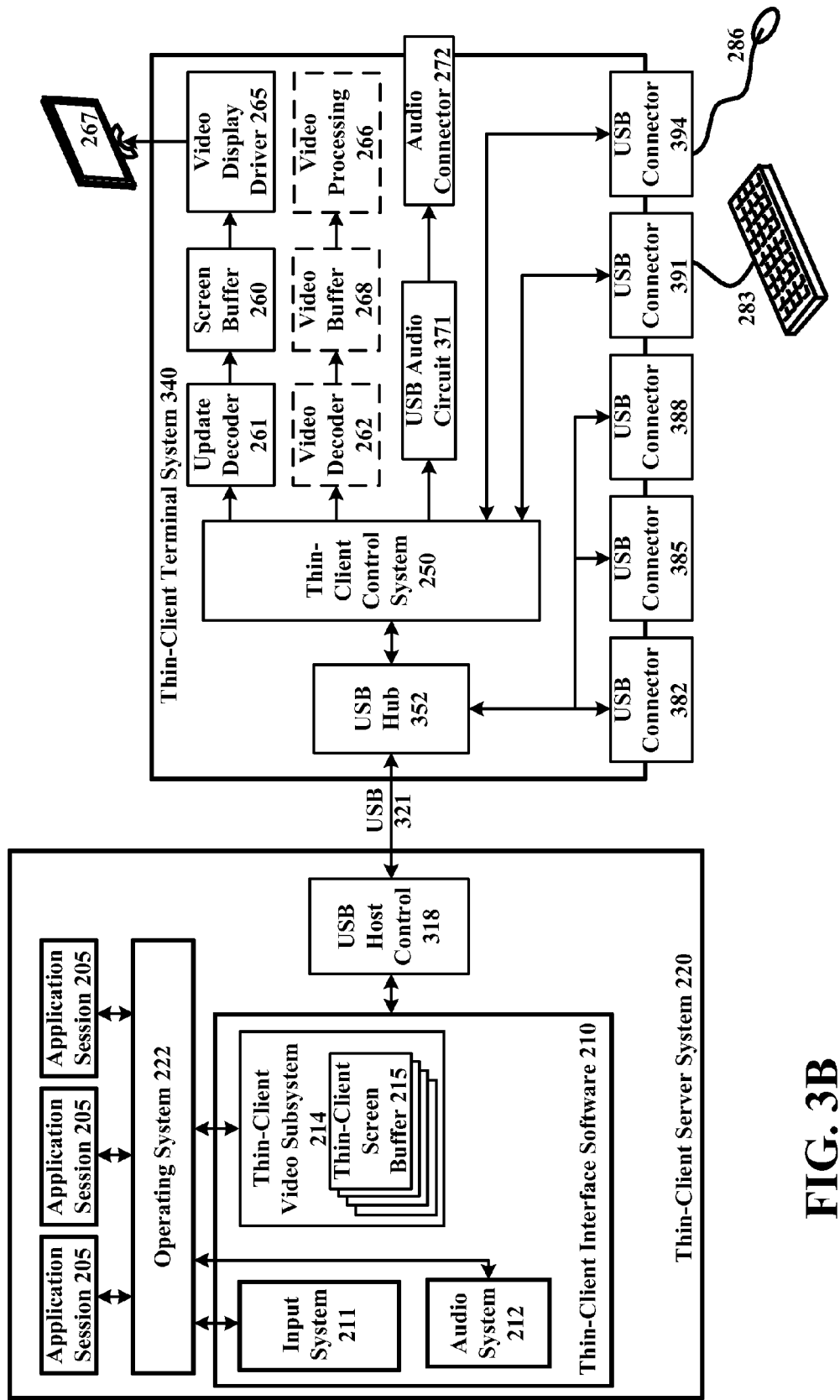
FIG. 3B illustrates a second embodiment of a thin-client terminal system implemented with a USB interface.

FIG. 3B illustrates an example embodiment of a thin-client terminal system 340 implemented with a USB interface. The embodiment of FIG. 3B may differ from the implementation of FIG. 3A in that the design of the embodiment of FIG. 3B may be simpler. In the embodiment of FIG. 3B, the thin-client terminal system 340 uses a USB hub 352 to interface with the USB line 321. The subsystems in the thin-client terminal system 340 are then all individual USB devices.

USB keyboard 283 input device and USB mouse 286 input device may be handled with normal USB connectors (391 and 394, respectively). Audio output may be provided by using a USB audio circuit 371. Additional USB devices can easily be added to the thin-client terminal system 340 by interfacing with additional USB connectors to the thin-client terminal system 340 such as USB connectors 382, 385, and 388.

Thin-client control system 250 may interface with USB hub 352 to receive USB data transmitted from the thin-client server system 320. Thin-client control system 250 may determine a type of data (e.g., video data, audio data, input/output data) and provide the data to the corresponding component. As part of such determination, thin-client control system 250 may decode the USB data into a data format recognizable by the destination component. However, where the thin-client terminal system component is implemented as a USB device, no decoding is necessary. Although the USB hub 352 can be implemented with an ordinary USB circuit, it should identify itself to the USB host controller 318 as a thin-client terminal system 340. In this manner, the computer system that the thin-client terminal system 340 is coupled to will know that the USB hub 352 is associated with a thin-client terminal system 340 and that all of the individual USB devices coupled to USB hub 352 (such as 382, 385, 388, 391, and 394) are subsystems of the thin-client terminal system 340.

Figure 3C:
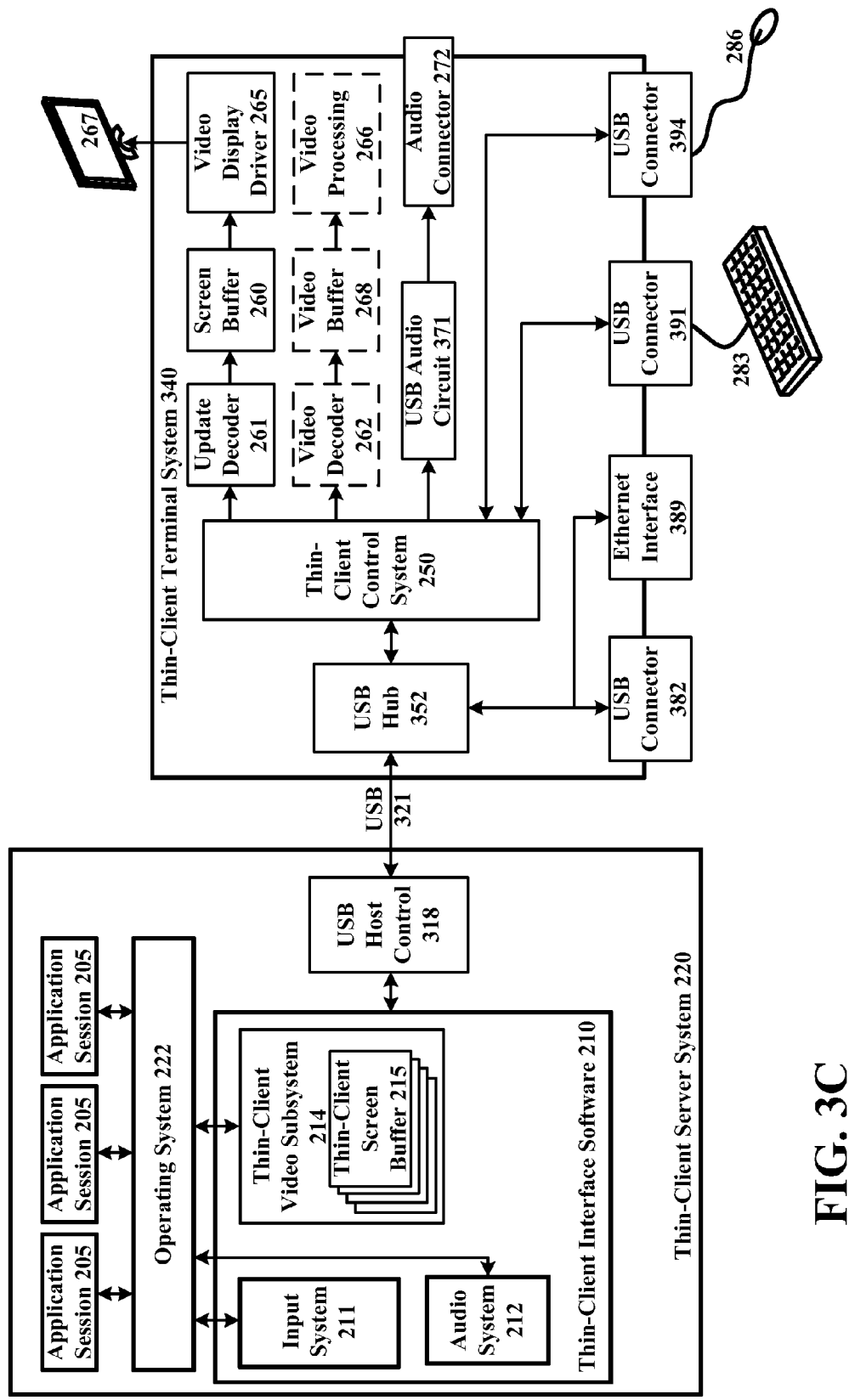
FIG. 3C illustrates the thin-client terminal system embodiment of FIG. 3B with an Ethernet interfaced added.

Additional interfaces can be added to the systems illustrated in FIGS. 3A and 3B. For example, FIG. 3C illustrates the system of FIG. 3B with an Ethernet interface 389 added. In the example embodiment of FIG. 3C, the Ethernet interface 389 may pass Ethernet data to the USB hub 352 for encoding and transmission to the thin-client server system 320. With an Ethernet interface 389 added, additional thin-client terminal systems 240 from FIG. 2B may be added onto the thin-client terminal system 340 of FIG. 3C. In this respect, Ethernet interface 389 may serve as a hub or switch to which other thin-client terminal systems may be chained or connected.

Figure 3D:
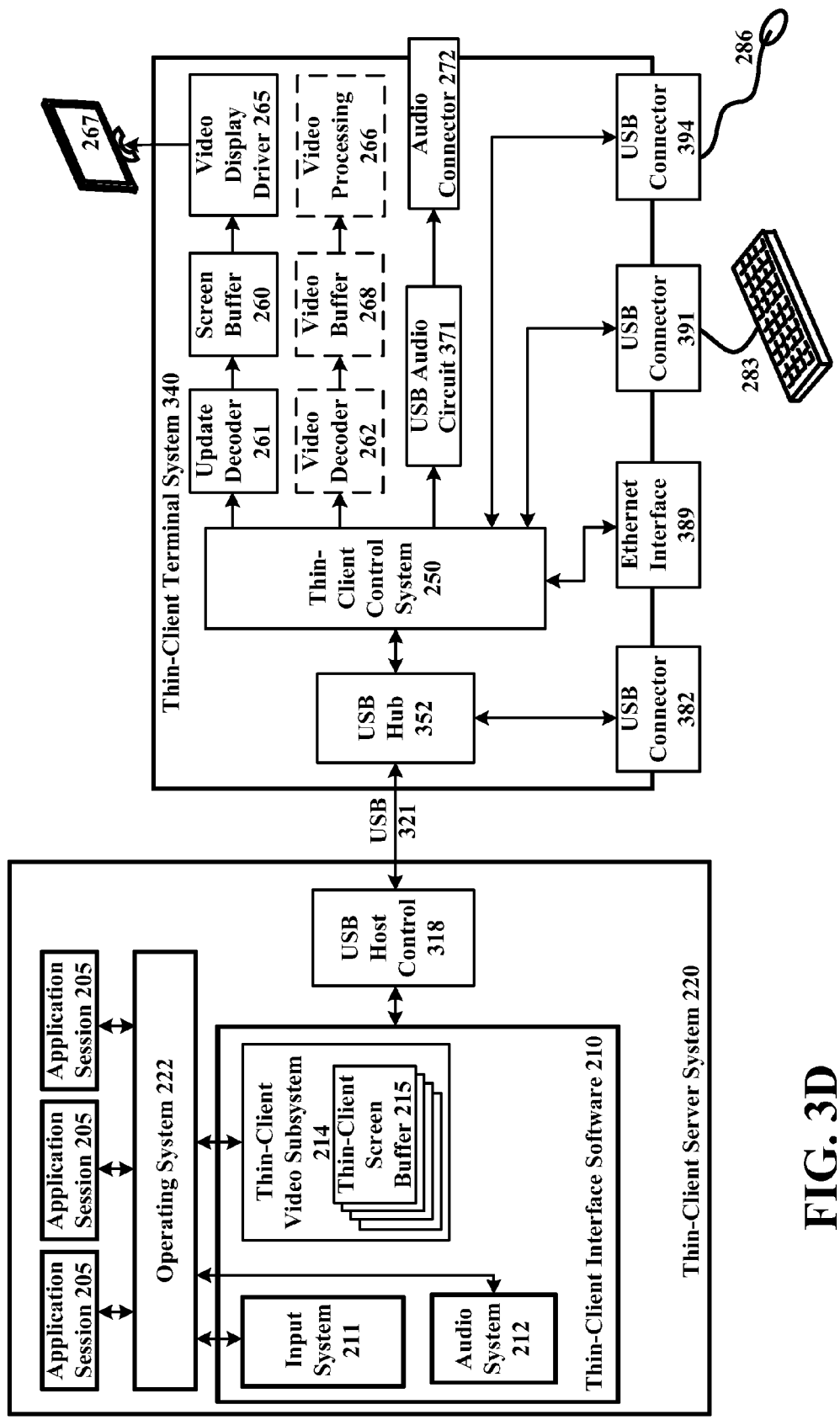
FIG. 3D illustrates the thin-client terminal system embodiment of FIG. 3B with an Ethernet interfaced added.

FIG. 3D illustrates an example embodiment of a thin-client terminal system in which an Ethernet interface 389 is connected to a thin-client control system 250. The thin-client terminal system 340 of FIG. 3D may be similar to the thin-client terminal system embodiment of FIG. 3C, save for the Ethernet interface 389. By connecting the Ethernet interface 389 to the thin-client control system 250, Ethernet data may be processed by the thin-client control system 250 without the need to convert the Ethernet data into USB data first, as is the case in the example embodiment of FIG. 3C.

Thin-Client Terminal System Connections

Figure 4:
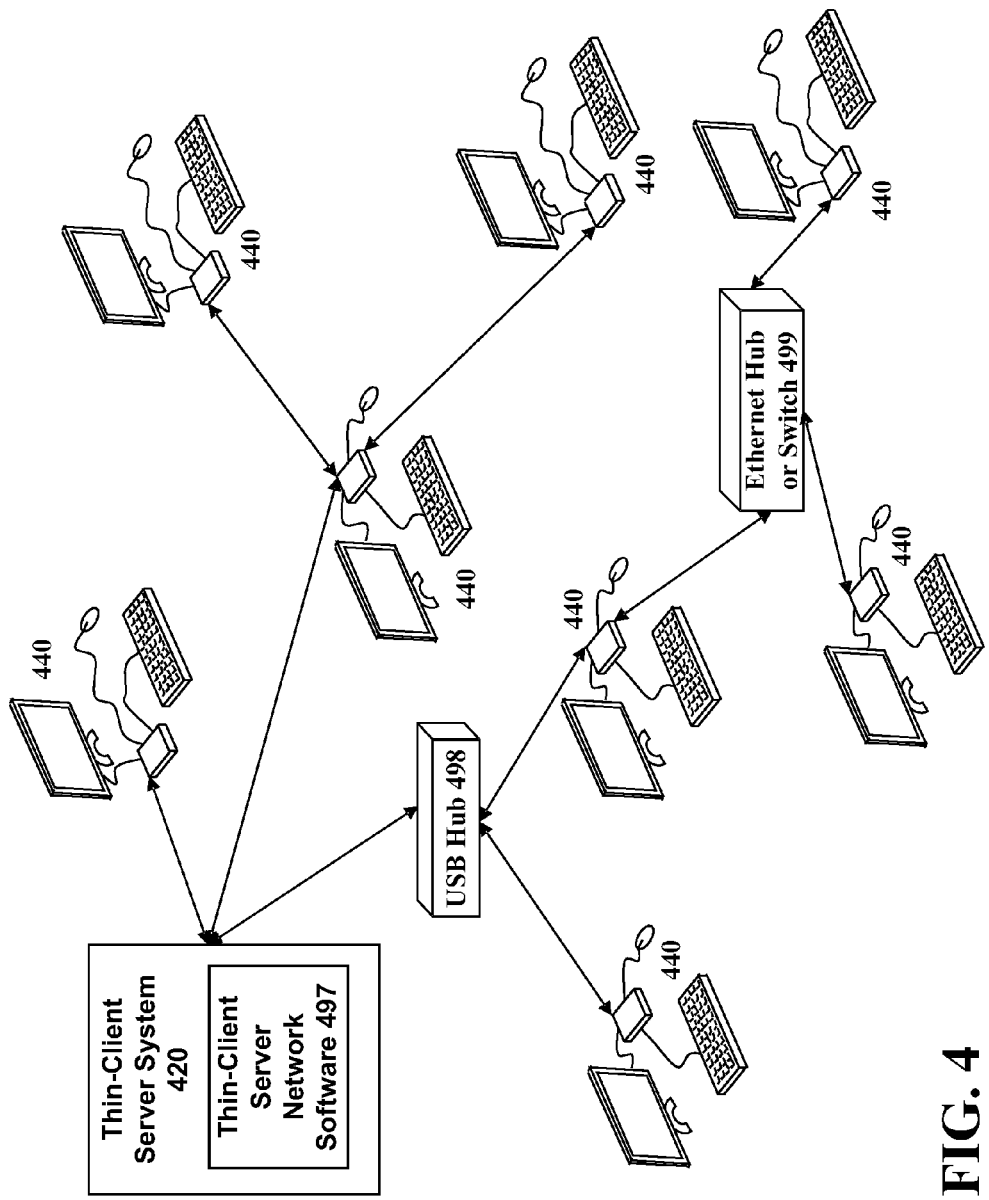
FIG. 4 illustrates various different permutations of coupling thin-client terminal devices to a server system using USB and Ethernet.

With the thin-client architecture set forth in FIGS. 2B, 3A, 3B, 3C, and 3D many different permutations of systems may be coupled together. FIG. 4 illustrates many of the connections that may be made. A thin-client terminal system 440 may be coupled directly to a server system 420. A thin-client terminal system 440 may be coupled to another thin-client terminal system 440 using a USB connection that is in turn directly coupled to a server system 420. A thin-client terminal system 440 may be coupled to a USB hub 498 that is directly coupled to a server system 420. A thin-client terminal system 440 may be coupled to an Ethernet hub or switch 499 that is coupled to another thin-client terminal system 440 that is coupled to a USB hub 498 that is directly coupled to a server system 420. Thus, the use of one or more USB hubs 498 and/or Ethernet hubs or switches 499 may permit multiple thin-client terminal systems 440 to be daisy chained, thereby forming a network of thin-client terminal systems connected to the thin-client server system 420. Many additional permutations exist as will be clear to those skilled in the art.

An Example Method for Supporting a Thin-Client Terminal System

Figure 5:
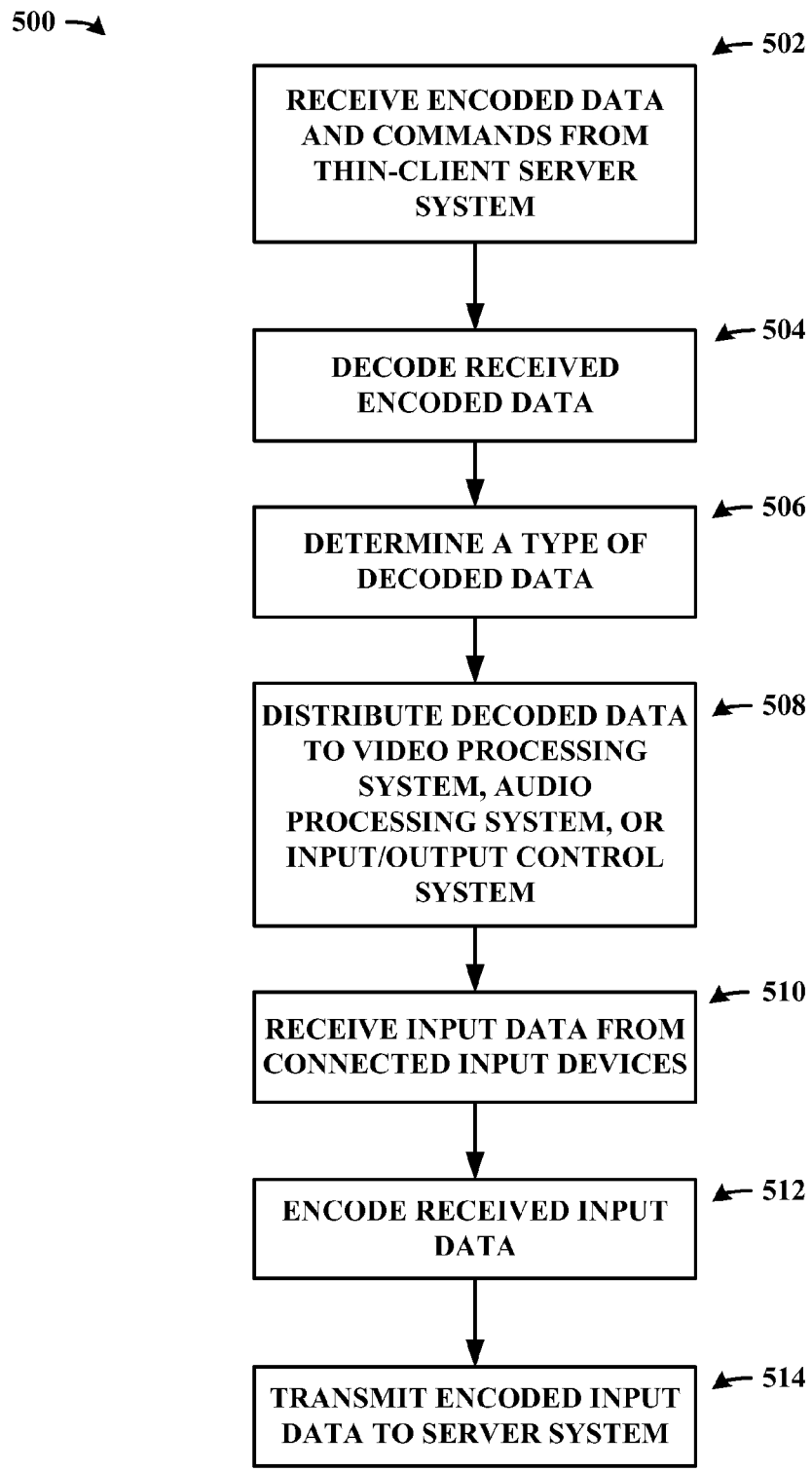
FIG. 5 is a flow diagram illustrating an example method for supporting a thin-client terminal system.

FIG. 5 is a flow diagram of an example method for supporting a thin-client terminal system. At operation 502, a thin-client terminal system may receive encoded output data and commands from a thin-client server system. In an example embodiment, a serial bus interface device of the thin-client terminal system may receive the encoded output data and commands from a serial bus host controller of the thin-client server system. The serial bus interface device may be a USB hub. The serial bus host controller may be a USB host controller.

At operation 504, the received encoded output data and commands may be decoded. In an example embodiment, the serial bus interface device may decode the encoded output data and commands using a serial bus data format. The decoded output data and commands may be provided to a thin-client control system of the thin-client terminal device.

At operation 506, the thin-client control system may determine a type of data for the decoded output data. For example, the thin-client control system may determine that the decoded data is video data. In other example embodiments, the thin-client control system may determine that the decoded data is audio output data or input/output data.

At operation 508, the thin-client control system may distribute the decoded output data for processing to at least one of a video processing system, an audio processing system, and an input/output control system. The video processing system may delineate between video graphics data and full-motion video data. For video graphics data, the video processing system may perform various video processing procedures on the decoded output data, including but not limited to, decoding the video output data, storing the decoded video output data, and generating a video signal from the stored video output data. For full-motion video data, the video processing system may perform video processing procedures, including but not limited to, decoding the full-motion video data to obtain a set of video frames, storing the video frames in a buffer, and processing the video frames for display in a video window. An audio processing system may process the audio data to create a sound signal for output at the thin-client terminal system. Input/output control system may process decoded output data to obtain commands and data for use with input devices attached to the thin-client terminal system.

At operation 510, the thin-client control system may receive input data from input devices (e.g., keyboard, mouse) that are attached to the thin-client terminal system. The input devices may be attached to one or more USB connectors of the thin-client terminal system or may interface with the thin-client terminal system via PS/2 connectors.

At operation 512, the received input data may be encoded by the serial bus interface device (e.g., USB hub) using the serial bus data format. For example, keyboard and mouse input data and commands may be encoded as USB data capable of being transmitted by a USB cable. In an example embodiment, the serial bus interface device may also encode Ethernet data received from an Ethernet interface connected to the serial bus interface device. At operation 514, the encoded input data may be transmitted to the thin-client server system for processing.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A thin-client terminal system, comprising:
a serial bus interface circuit configured to:
  communicate with a thin-client server system via a serial bus cable; and
  decode video data received from the server system that is Ethernet data encoded in a serial bus data format; and
a thin-client control system communicatively coupled to the serial bus interface circuit and configured to:
  receive the decoded video data from the serial bus interface circuit;
  distribute the decoded video data for processing to a video processing system in the thin-client terminal system, the video processing system comprising a graphics display processing path and a full-motion video processing path;
  distinguish between video graphics data and full-motion video data within the decoded video data;
  process the video graphics data by the graphics display processing path;
  process the full-motion video data by the full-motion video processing path;
  receive input data from at least one serial interface connection in the thin-client terminal system;
  provide the input data to the serial bus interface circuit, the serial bus interface circuit being further configured to transmit the input data to the thin-client server system; and
  wherein the thin-client terminal system includes at least one of:
    a first-thin client terminal system directly connected to the thin-client server system,
    a second thin-client terminal system including at least one of a USB connector and an Ethernet interface, through which the second thin-client terminal system connects to the thin-client server system via at least one of a USB hub, an Ethernet hub, and an Ethernet switch, and
    the thin-client server system is configured to generate and transmit output data to the thin-client terminal system.

2. The thin-client terminal system of claim 1, wherein the serial bus data format is Universal Serial Bus (USB) and wherein the serial bus interface circuit is a USB hub.

3. The thin-client terminal system of claim 1, wherein the USB hub is connected to at least one USB connector in the thin-client terminal system, the at least one USB connector each providing an interface for a USB-enabled device to connect to the thin-client terminal system.

4. The thin-client terminal system of claim 1, wherein the graphics display processing path comprises a screen update decoder, a screen buffer, and a video display driver, wherein the screen update decoder is configured to decode the received video graphics data, wherein the screen buffer is configured to store the decoded video graphics data, and wherein the video display driver is configured to generate a video display signal from the stored video graphics data.

5. The thin-client terminal system of claim 1, wherein the full-motion video processing path comprises a video decoder, a video buffer, and a video processing component, wherein the video decoder is configured to decode the received full-motion video data to obtain video frames, wherein the video buffer is configured to store the video frames from the decoded full-motion video data, and wherein the video processing component is configured to process the video frames for display in a video window.

6. The thin-client terminal system of claim 1, wherein the serial bus interface circuit is configured to transmit data to and receive data from a serial bus host controller in the server system via the serial bus cable.

7. The thin-client terminal system of claim 1, wherein the serial bus interface circuit is connected to an Ethernet interface, the Ethernet interface configured to connect the thin-client terminal system to an additional thin-client terminal system via an Ethernet cable connected to the Ethernet interface, wherein the serial bus interface circuit is further configured to convert Ethernet data into USB data.

8. The thin-client terminal system of claim 1, further comprising an input/output control system communicatively coupled to the thin-client control system and configured to interface with a keyboard and a mouse, wherein the keyboard and the mouse are connected to the thin-client terminal system by at least one of a PS/2 connector and a USB connector.

9. The thin-client terminal system of claim 1, wherein the thin-client control system is connected to an Ethernet interface, the thin-client control system being further configured to transmit data to an additional thin-client terminal system connected to the thin-client terminal system via the Ethernet interface.

10. The thin-client terminal system of claim 1, wherein the data received from the server system by the serial bus interface circuit includes audio data, video data, and input/output device data.

11. A thin-client system, comprising:
a thin-client server system; and
a thin-client terminal system comprising:
  a serial bus interface circuit configured to:
    communicate with the thin-client server system via a serial bus cable; and
    decode output data received from the thin-client server system that is Ethernet data encoded in a serial bus data format; and
  a thin-client control system communicatively coupled to the serial bus interface circuit and configured to:
    receive the decoded output data from the serial bus interface circuit;
    distribute the decoded output data for processing to a video processing system in the thin-client terminal system, the video processing system comprising a graphics display processing path and a full-motion video processing path;
    distinguish between video graphics data and full-motion video data within the decoded output data;
    process the video graphics data by the graphics display processing path;
    process the full-motion video data by the full-motion video processing path;
    receive input data from at least one serial interface connection in the corresponding thin-client terminal system;
    provide the input data to the serial bus interface circuit, the serial bus interface circuit being further configured to transmit the input data to the thin-client server system; and
wherein the thin-client terminal system includes at least one of:
  a first thin-client terminal system directly connected to the thin-client server system, and
  a second thin-client terminal system including at least one of a USB connector and an Ethernet interface, through which the second thin-client terminal system connects to the thin-client server system via at least one of a USB hub, an Ethernet hub, and an Ethernet switch, and
  the thin-client server system configured to generate and transmit the output data to the thin-client terminal system.

12. The thin-client system of claim 11, wherein the thin-client server system includes a USB host controller that transmits the output data to the thin-client terminal system.

13. The thin-client system of claim 11, wherein the output data comprises video data, audio data, and input/output device data.

14. The thin-client system of claim 11, wherein the thin-client server system is further configured to receive and process input data from the thin-client terminal system.

15. A method of supporting a thin-client terminal system, wherein the thin-client terminal system includes at least one of:
  a first thin-client terminal system directly connected to a thin client server-system,
  a second thin-client terminal system including at least one of a USB connector and an Ethernet interface through which the second thin-client terminal system connects to the thin-client server system via at least one of a USB hub, an Ethernet hub, and an Ethernet switch, and
wherein the thin-client server system is configured to generate and transmit output data to the thin-client terminal system, the method comprising:
  receiving, at a serial bus interface device of the thin-client terminal system, output data and commands from a thin-client server system, the output data corresponding to Ethernet data encoded according to a serial bus data format, the commands encoded according to a serial bus data format;
  decoding the output data and commands;
  distributing decoded video data for processing to a video processing system, the video processing system comprising a graphics display processing path and a full-motion video processing path;
  distinguishing between video graphics data and full-motion video data within the decoded video data;
  processing the video graphics data by the graphics display processing path;
  processing the full-motion video data by the full-motion video processing path;
  receiving input data from at least one serial interface connection in the thin-client system;
  providing the received input data to the serial bus interface circuit, the serial bus interface circuit being configured to transmit the received input data to the server system;
  encoding the received input data according to the serial bus data format; and
  transmitting, by the serial bus interface device, the encoded input data to the server system.

16. The method of claim 15, wherein the serial bus data format is Universal Serial Bus (USB) and wherein the serial bus interface circuit is a USB hub.

17. The method of claim 15, further comprising, for a determination that the decoded data is video graphics data:
  decoding the video graphics data;
  storing the decoded video graphics data in a screen buffer; and
  generating a video display signal from the stored video graphics data.

18. The method of claim 15, further comprising, for a determination that the decoded data is full-motion video data:
  decoding the full-motion video data to obtain a set of video frames;
  storing the set of video frames in a video buffer; and
  processing the set of video frames for display in a video window.

19. The method of claim 15, wherein the encoded output data and commands are received from a serial bus host controller in the server system.

20. The method of claim 16, further comprising providing at least one USB connector in the thin-client terminal system that is connected to the USB hub, the at least one USB connector each providing an interface for a USB-enabled device to connect to the thin-client terminal system.

21. The method of claim 16, further comprising providing an Ethernet interface in the thin-client terminal system that is connected to the USB hub, the Ethernet interface providing an interface to connect the thin-client terminal system to an additional thin-client terminal system via an Ethernet cable connected to the Ethernet interface, and wherein the USB hub converts Ethernet data into USB data.

22. The method of claim 15, further comprising:
providing an Ethernet interface in the thin-client terminal system that is connected to the thin-client control system; and
transmitting data to an additional thin-client terminal system connected to the thin-client terminal system via the Ethernet interface.

23. The method of claim 15, wherein the encoded output data and commands received from the server system by the serial bus interface circuit include audio data, video data, and input/output device data.

24. The method of claim 15, wherein the at least one input device from which the input data is received comprises at least one of a graphical user interface, a keyboard, a mouse, a trackball, a trackpad, and a touch-enabled device, and wherein the encoded input data transmitted to the server system is processed by the server system.

* * * * *